(12) United States Patent
Zhou et al.

(10) Patent No.: US 10,927,465 B2
(45) Date of Patent: Feb. 23, 2021

(54) BROWNMILLERITE OXIDES FOR OXYGEN EVOLUTION CATALYST

(71) Applicant: Toyota Motor Engineering & Manufacturing North America, Inc., Erlanger, KY (US)

(72) Inventors: Li Qin Zhou, Ann Arbor, MI (US); Krishna Reddy Gunugunuri, Ann Arbor, MI (US); Chen Ling, Ann Arbor, MI (US); Hongfei Jia, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 15/444,732

(22) Filed: Feb. 28, 2017

(65) Prior Publication Data
US 2018/0142364 A1 May 24, 2018

Related U.S. Application Data

(60) Provisional application No. 62/424,748, filed on Nov. 21, 2016.

(51) Int. Cl.
| | | |
|---|---|---|
| C25B 11/04 | (2006.01) | |
| C01G 51/00 | (2006.01) | |
| C25B 1/04 | (2021.01) | |

(52) U.S. Cl.
CPC .......... C25B 11/0452 (2013.01); C01G 51/66 (2013.01); C25B 1/04 (2013.01);
(Continued)

(58) Field of Classification Search
CPC ... C25B 11/0452; C25B 1/04; C25B 11/0405; C25B 11/0415; C01G 51/66
See application file for complete search history.

(56) References Cited

U.S. PATENT DOCUMENTS

| | | | |
|---|---|---|---|
| 5,968,330 A | * | 10/1999 | Guth .................. G01N 27/4075 204/421 |
| 6,033,632 A | | 3/2000 | Schwartz et al. |
| 7,866,486 B2 | | 1/2011 | Werth et al. |

FOREIGN PATENT DOCUMENTS

| | | |
|---|---|---|
| GB | 1461155 A | 1/1977 |
| JP | 5773350 B2 | 9/2015 |

(Continued)

OTHER PUBLICATIONS

Lindberg et al., "Synthesis and Structural Studies of SR2CO2XGAXO5, 0.3PXP0.8", Journal of Solid State Chemistry 173 (2003) 395-406.
(Continued)

*Primary Examiner* — James A Fiorito
(74) *Attorney, Agent, or Firm* — Dinsmore & Shohl LLP (57) ABSTRACT

An oxygen evolution catalyst of the formula: $Sr_2MCoO_5$ where M=Al, Ga wherein M is bonded with four oxygen atoms to form a tetrahedron. The catalyst is operated at a potential of less than 1.58 volts vs. RHE at a current density of 50 $\mu A/cm^2$ for a pH of 7-13. The catalyst is operated at a potential of less than 1.55 volts vs. RHE at a current density of 50 $\mu A/cm^2$ and a pH of 13. The oxygen evolution catalyst of the formula: $Sr_2GaCoO_5$ wherein the catalyst is operated at a potential of less than 1.53 volts vs. RHE at a current density of 50 $\mu A/cm^2$ and a pH of 7. The oxygen evolution catalyst of formula: $Sr_2GaCoO_5$ wherein the catalyst maintains a current within 94% after 300 minutes at a potential of 1.645 volts vs. RHE wherein the current is greater than 1 milliamp and a pH of 7.

18 Claims, 10 Drawing Sheets

(52) U.S. Cl.
CPC ...... *C25B 11/0405* (2013.01); *C25B 11/0415* (2013.01); *C01P 2002/72* (2013.01); *C01P 2004/04* (2013.01); *C01P 2006/40* (2013.01); *Y02E 60/36* (2013.01)

(56) References Cited

FOREIGN PATENT DOCUMENTS

| | | |
|---|---|---|
| WO | 2004103546 A2 | 12/2004 |
| WO | 2012037526 A2 | 3/2012 |

OTHER PUBLICATIONS

Lindberg et al., "Synthesis and Structural Studies of Sr2Co2xAlxO5,0.3 pxp0.5", Journal of Solid State Chemistry 177 (2004) 1592-1597.

Istomin et al., "An Unusual High-Spin Ground State of CO3+ in Octahedral Coordination in Brownmillerite-type Cobalt Oxide", Dalton Transactions, Royal Society of Chemistry, Feb. 2, 2015.

Han et al., "Activity and Stability Trends of Perovskite Oxides for Oxygen Evolution Catalysis at Neutral PH", PCCP, Royal Society of Chemistry, Aug. 7, 2015 (Phys.Chem.Chem.Phys., 2015, 17, 22576).

Suntivich et al., "A Perovskite Oxide Optimized for Oxygen Evolution Catalysis From Molecular Orbital Principles", www.sciencemag.org Science vol. 334 Dec. 9, 2011.

\* cited by examiner

BROWNMILLERITE OXIDES FOR OXYGEN EVOLUTION CATALYST

CROSS REFERENCE TO RELATED APPLICATION(S)

This application claims the benefit of U.S. Provisional Patent Application No. 62/424,748 filed Nov. 21, 2016, the entire contents of which are incorporated herein by reference.

TECHNICAL FIELD

The present specification relates to an oxygen evolution catalyst and apparatus for the electrochemical and photochemical-electrolysis of water, and in particular to a process and apparatus using a material of the formula: $Sr_2MCoO_5$ where M=Al and Ga as an oxygen evolution reaction catalyst.

BACKGROUND

The oxygen evolution reaction (OER) is an enabling process for various energy storage applications including splitting water and use in metal air batteries. In particular, hydrogen has long been considered an ideal fuel source, as it offers a clean, non-polluting alternative to fossil fuels. One source of hydrogen is the splitting of water into hydrogen ($H_2$) and oxygen ($O_2$), as depicted in equation (1).

$$2H_2 \rightarrow O_2 + 2H_2 \quad (1)$$

In an electrochemical half-cell, the water-splitting reaction comprises two half-reactions:

$$2H_2O \rightarrow O_2 + 4H^+ + 4e^- \quad (2)$$

$$2H^+ + 2e^- \rightarrow H_2 \quad (3)$$

and hydrogen made from water using sunlight prospectively offers an abundant, renewable, clean energy source. However, the oxygen evolution half reaction is much more kinetically limiting than the hydrogen evolution half reaction and therefore can limit the overall production of hydrogen. As such, efforts have been made to search for efficient oxygen evolution reaction (OER) catalysts that can increase the kinetics of OER and increase the production of hydrogen from water. In particular, oxides of ruthenium and iridium have previously been identified as OER catalysts. However, as they are among the rarest elements on earth, it is not practical to use these catalysts on a large scale. Therefore, improved OER catalysts would be very useful in the development of hydrogen as an alternative fuel source.

Perovskite transition-metal oxides with the formula $ABO_3$ where A and B stand for different metal species have been developed with comparable activities to precious-metal-based catalysts in high-pH alkaline solution with lower cost. By changing the composition of A and B elements perovskite catalysts with performance better than $IrO_2$ may be achieved at pH 13 or pH 14 conditions.

However, current perovskite OER catalysts have various limitations on use under certain reaction conditions. Currently, perovskite type OER catalysts have deficiencies when used under reaction conditions that are not highly alkaline. In particular, perovskite type OER catalysts are not stable and have decreasing activities when used in a neutral or 7-pH system. Therefore, improved OER catalysts that are capable of use under alkaline and neutral reaction conditions are highly demanded.

Various potential methods to improve the OER activity include varying the size of A ion, replacing A ion with lower valent species, alloying different transition metal ions at B sites and have been extensively studied before. On the other hand, while the catalytic activity of oxides strongly depends on the polymorphic environment, the influence of crystal structure on OER performance has received much less attention.

SUMMARY

Figure 1A:
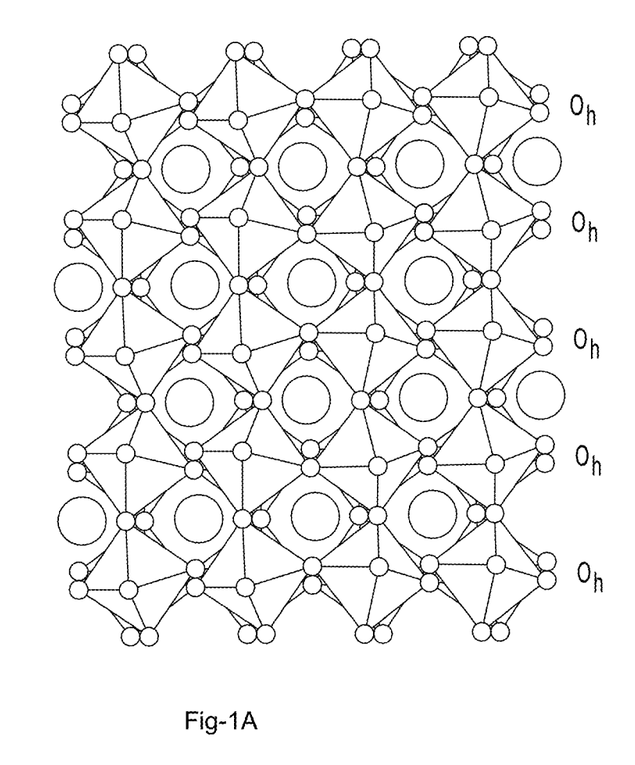
FIG. 1A is a graphic depiction of the crystal structure of a perovskite compound.
Figure 1B:
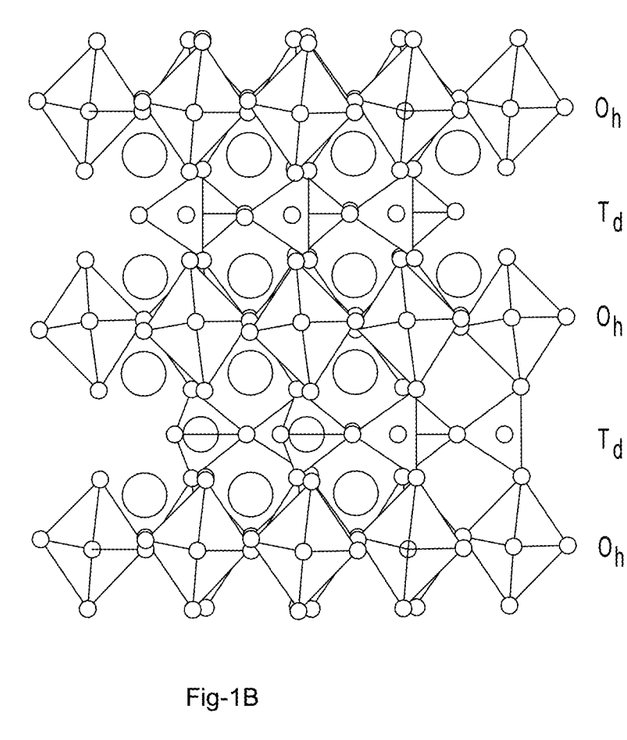
FIG. 1B is a graphic depiction of the crystal structure of a brownmillerite compound.

A potential crystal structure for an improved OER catalyst may include the brownmillerite family of oxides with $A_2BB'O_5$ where A stands for alkali earth metal such as Sr and Ba, B and B' stands for trivalent ions such as Mn, Fe, Co, Al and Ga. The crystal structure of brownmillerite is distinct from perovskite oxides, as shown in FIG. 1. In a perovskite structure as shown in FIG. 1A, transition metal ions (B) are located in an octahedral environment forming $O_h$—$O_h$—$O_h$ layers, where $O_h$ stands for the symmetry of an octahedron. In brownmillerite compounds, as shown in FIG. 1B while cation B still stays at an octahedral site, B' is bonded in an tetrahedral environment forming alternative $O_h$-$T_d$-$O_h$-$T_d$ layers. The change of polymorphic structure is significant as the electron overlapping between B—O σ-bond and B'—O σ-bond strongly relies on B—O—B' bond angle. Therefore, the varied B—O bond strength works as an additional way to tune OER activity in brownmillerite oxides.

In one aspect there is disclosed an oxygen evolution catalyst of the formula: $Sr_2MCoO_5$ where M=Al and Ga wherein the catalyst is operated at a potential of less than 1.55 volts vs. RHE at a current density of 50 μA/cm² and a pH of 13.

In another aspect, there is disclosed an oxygen evolution catalyst of the formula: $Sr_2MCoO_5$ where M=Al and Ga wherein the catalyst is operated at a potential of less than 1.58 volts vs. RHE at a current density of 50 μA/cm² and a pH of 7.

In a further aspect, there is disclosed an oxygen evolution catalyst of formula: $Sr_2GaCoO_5$ wherein the catalyst maintains a current within 94% after 300 minutes at a potential of 1.645 volts vs. RHE wherein the current is greater than 1 milliamp and a pH of 7.

DETAILED DESCRIPTION

The present disclosure provides catalyst compositions for an oxygen evolution reaction (OER) such as the oxidation of water to generate oxygen gases. A "catalyst" as used herein, means a material that is involved in and increases the rate of a chemical electrolysis reaction (or other electrochemical reaction) and which itself, undergoes reaction as part of the electrolysis, but is largely unconsumed by the reaction itself, and may participate in multiple chemical transformations. A catalytic material may be consumed in slight quantities during some uses and may be, in many embodiments, regenerated to its original chemical state. The reaction may include an oxygen evolution reaction or water oxidation reaction.

In one aspect, an oxygen evolution catalyst includes a material of the formula: $Sr_2MCoO_5$ where M=Al and Ga. The material may include structures related to brown elite oxides of the above formula where the M atom is bonded with four oxygen atoms to form a tetrahedron and are highly active and stable catalysts for an oxygen evolution reaction at various conditions such as at various pH levels such as from 7-13.

In one aspect, the brownmillerite oxides may be combined with conductive particles such as carbon black and may include a binder such as NAFION®, a sulfonated tetrafluoroethylene based fluoropolymer copolymer sold by DuPont. The combined material may be attached to an electrode substrate using any method known to those in the art. Various electrode substrates may be utilized that are capable of conducting current such as for example, glassy carbon, carbon black or other materials.

The catalyst can include a plurality of particles of the formula $Sr_2MCoO_5$ where M=Al and Ga. The catalyst material of the above formula may be prepared by various methods including solid-state reactions, as will be discussed in more detail below.

The catalyst is further described by the following examples, which are illustrative and are not intended as limiting the scope as defined in the claims.

EXAMPLES

Preparation of $Sr_2GaCoO_5$ and $Sr_2AlCoO_5$ Catalyst Materials.

Figure 2A:
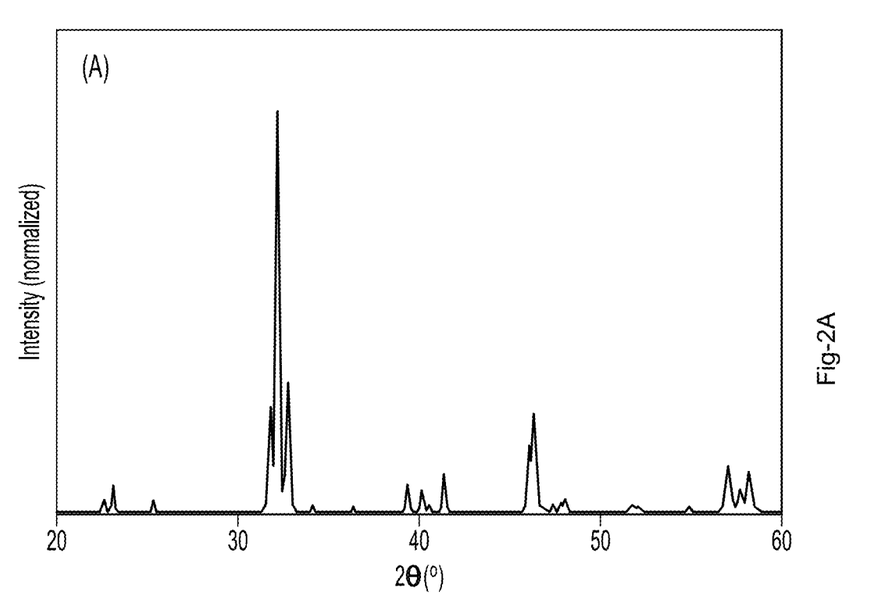
FIG. 2A is an x-ray diffraction pattern for $Sr_2GaCoO_5$.
Figure 2B:
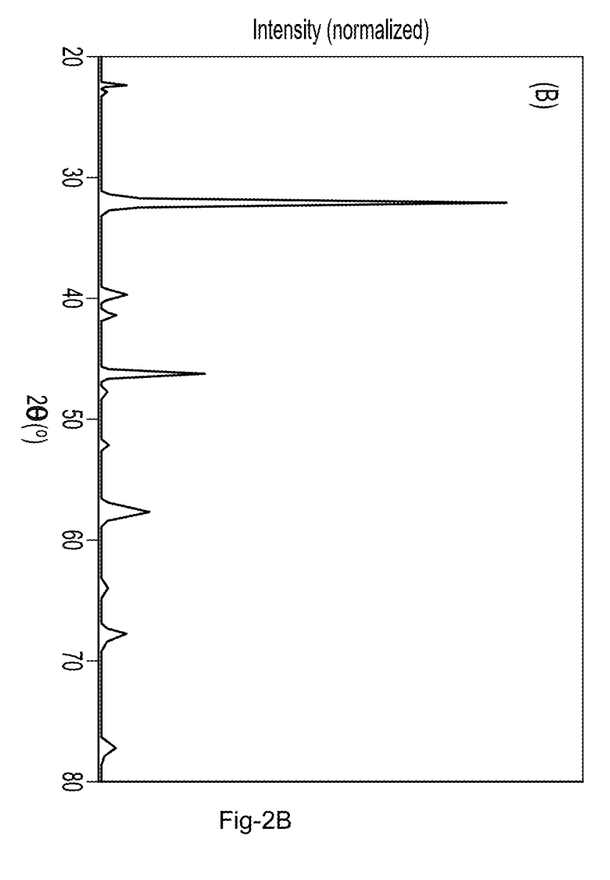
FIG. 2B is an x-ray diffraction pattern for $Sr_2AlCoO_5$.

$Sr_2MCoO_5$ (M=Ga and Al) were synthesized by solid-state reaction. Stoichiometric amounts of $SrCO_3$, $Ga_2O_3$ (or $Al_2O_3$) and $Co_3O_4$ (all 99.9% pure, from Sigma Aldrich) were ball milled together and placed in an alumina crucible for calcination at 1100° C. for 24 hours. The mixtures were then carefully grinded in a mortar followed by sintering. The sintering for $Sr_2GaCoO_5$ was at 1100° C. for 216 hours with 3 intermediate re-grindings whereas it was at 1250° C. for 288 hours with 4 intermediate re-grinding for $Sr_2AlCoO_5$. The pure phase was attained for both materials, as shown in the X-ray diffraction patterns of FIG. 2. Both materials are pure brownmillerite single phase. (A) can be assigned to PDF 04-011-4323 and (B) to PDF 04-006-6079.

To fabricate a working electrode, a catalyst ink was first prepared by sonicating a mixture of catalyst particles, carbon black (CB), and Nation solution with tetrahydofuran (THF) with a catalyst concentration of 5 mg/mL, and then drop-casting (10 μL) onto pre-polished glassy carbon disk electrodes (5 mm in diameter).

Example 1

Linear sweep voltammogram (LSV) of $Sr_2GaCoO_5$ and $Sr_2AlCoO_5$ catalyst materials was performed. Working electrodes as described above were utilized. The electrochemical measurements were done in a three-electrode glass cell (125 ml) with the working electrode rotating at a rate of 1600 rpm, and Ag/AgCl (3M NaCl) as the reference. The counter electrode (Pt coil) was isolated from e main electrochemical cell using a fritted glass tube. The electrolyte utilized was of 0.1M KOH (pH 13).

Figure 3:
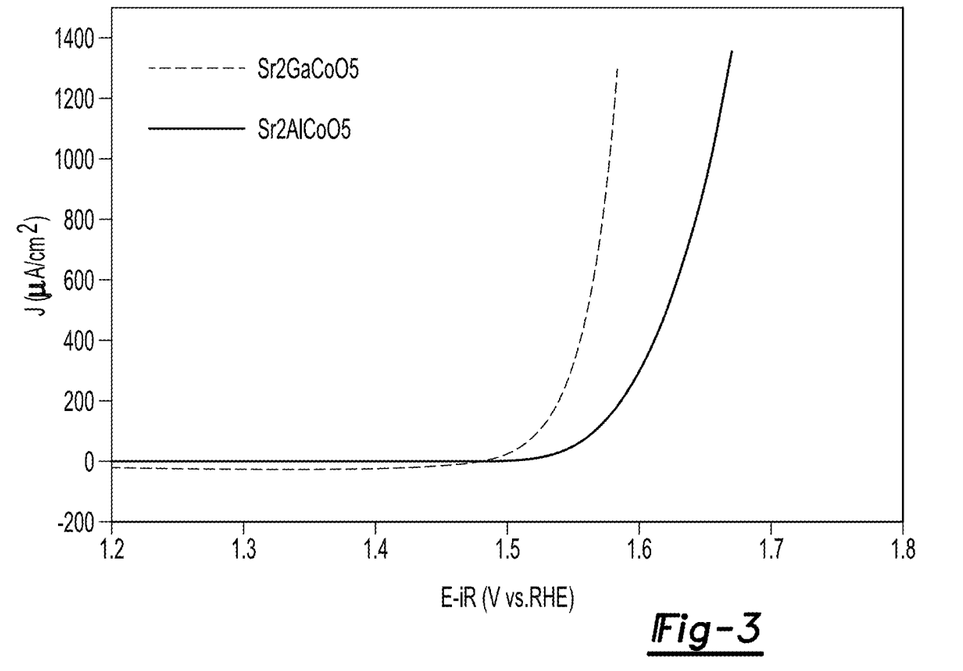
FIG. 3 is a linear sweep voltammetry plot for $Sr_2GaCoO_5$, and $Sr_2AlCoO_5$ catalyst materials at 1 mV/s at pH 13.

LSV plots for the $Sr_2GaCoO_5$ and $Sr_2AlCoO_5$ particles at a pH of 13 are shown in FIG. 3. The LSV plots were generated at a scan rate of 1 mV/s. The overpotential of 50 μA/cm² was used as an indicator for demonstrated OER activity with activity values for $Sr_2GaCoO_5$ of 0.28 V and $Sr_2AlCoO_5$ of 0.32 V. These values are comparable to $Ba_{0.5}Sr_{0.5}Co_{0.8}Fe_{0.2}O_{3-\delta}$ (BSCF) considered to be state of the art prior art catalyst and demonstate the use of the above catalysts in an OER reaction.

Example 2

Figure 4:
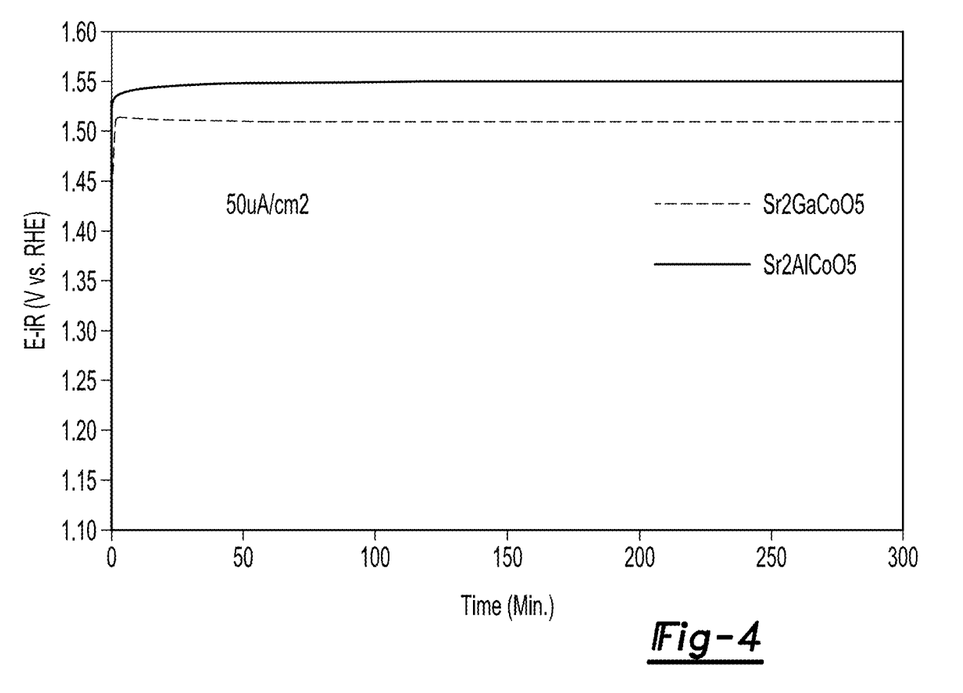
FIG. 4 are galvanostatic plots for $Sr_2GaCoO_5$ and $Sr_2AlCoO_5$ catalyst materials at 50 μA/cm² and pH 13.

Galvanostatic testing was also performed on the materials using the same working electrode and experimental cell as described above. Referring to FIG. 4, galvanostatic plots for $Sr_2GaCoO_5$ and $Sr_2AlCoO_5$ catalyst materials at 50 μA/cm² and pH 13 are provided.

As can be seen in the plots, the catalytic materials demonstrated a stability after an initial startup of the procedure with a near flat plot for a period out to 300 minutes.

Example 3

Figure 5A:
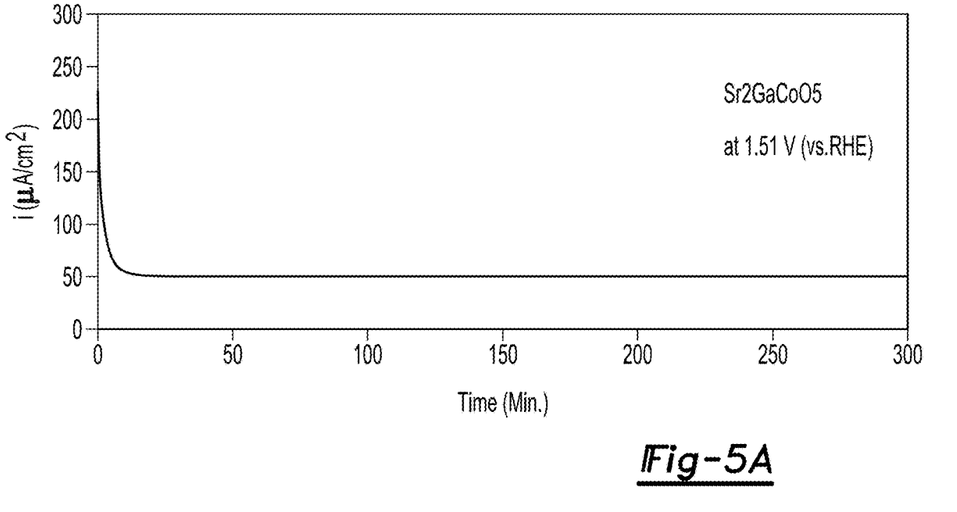
FIG. 5A is a potentiostatic plot measured at 1.51 V vs. RHE for $Sr_2GaCoO_5$ and pH 13.
Figure 5B:
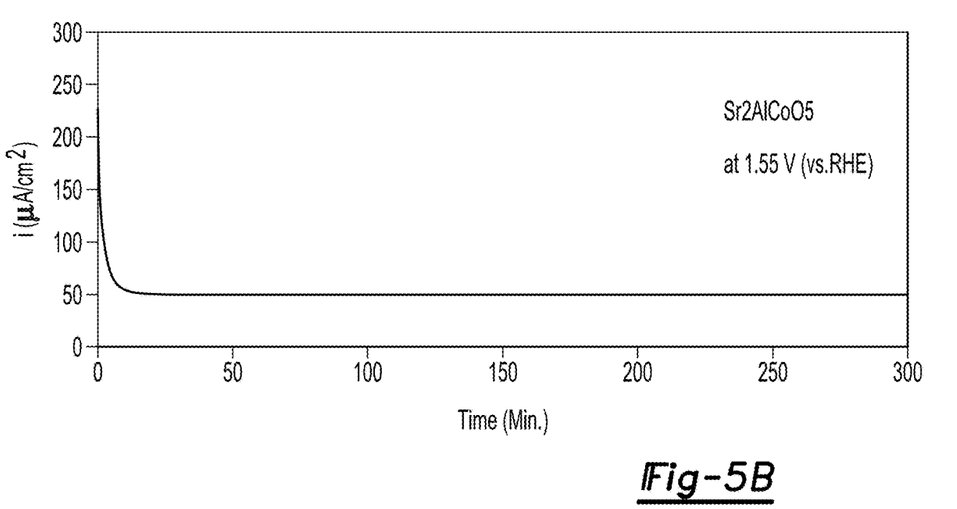
FIG. 5B is a potentiostatic plot measured at 1.55 V vs. RHE for $Sr_2AlCoO_5$ and pH 13.

Potentiostatic measurements were performed on the $Sr_2GaCoO_5$ and $Sr_2AlCoO_5$ catalyst materials using the apparatus as described above. FIG. 5 is a potentiostatic plot measured at 1.51 V vs. RHE for $Sr_2GaCoO_5$, and 1.55 V vs. RHE for $Sr_2AlCoO_5$. As can be seen in the plots the catalytic materials demonstrated a stability after an initial startup of the procedure. The current remains stable and within 97% of its value after 300 minutes for all of the catalytic materials. The stability of the materials exceeds those of prior art materials that may degrade over time.

Example 4

Figure 6:
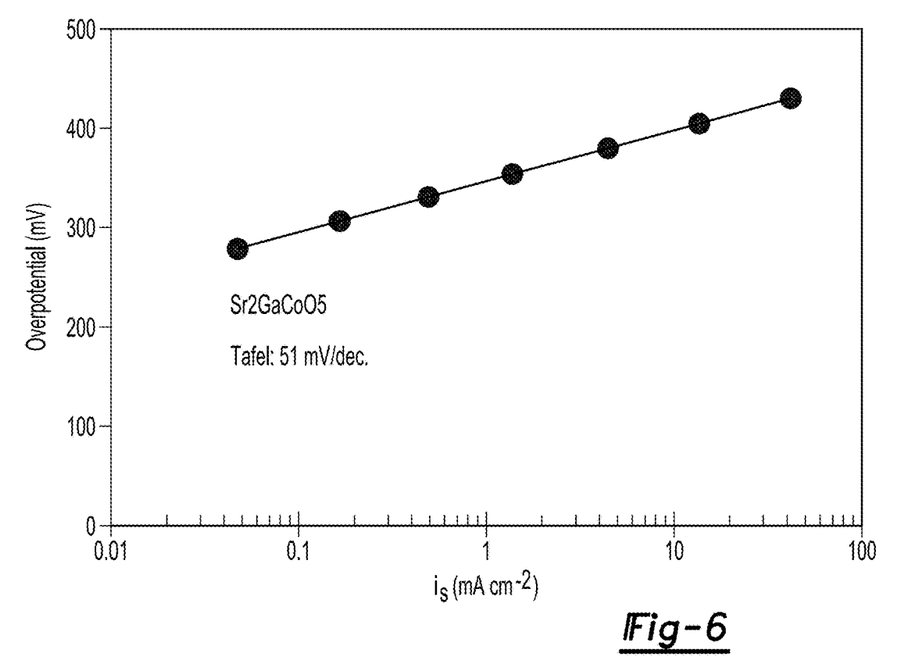
FIG. 6 is a Tafel plot of $Sr_2GaCoO_5$ at pH 13.
Figure 7:
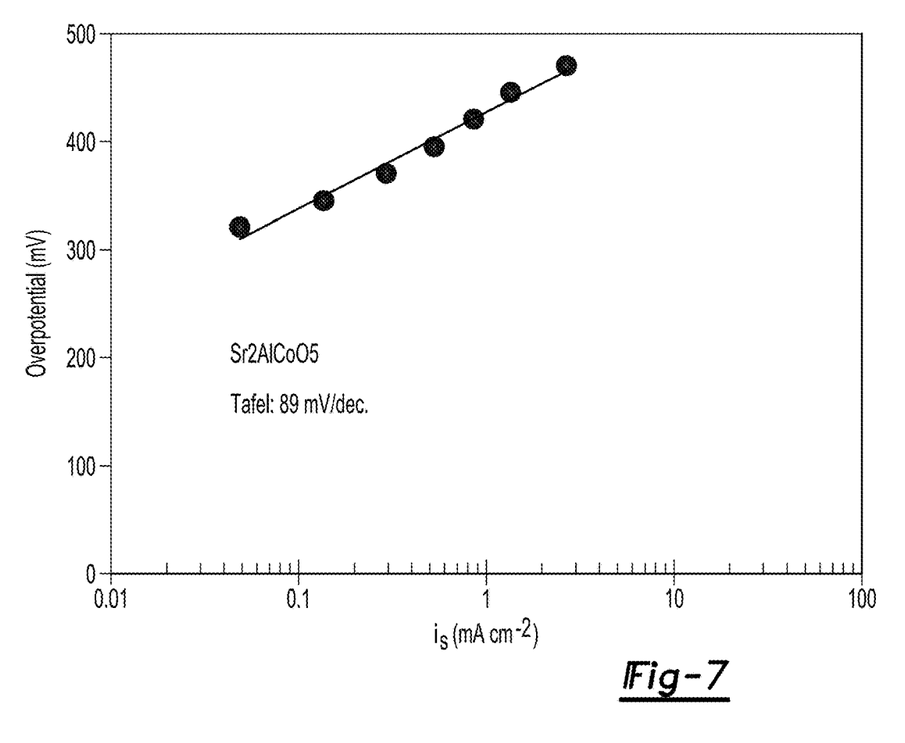
FIG. 7 is a Tafel plot of $Sr_2AlCoO_5$ at pH 13.

The value of the Tafel slope represents an important parameter to estimate the performance of an OER catalyst. The Tafel slope indicates the current density changes with increasing overpotential. Tafel plot measurements of the catalyst materials at pH 13 are shown in FIGS. 6-7. The Tafel slopes for the materials are 51 mV/decade for $Sr_2GaCoO_5$, and 89 mV/decade for $Sr_2AlCoO_5$ catalyst materials. The Tafel slopes indicate a good activity that combined with the superior stability makes the materials desirable OER catalysts.

Example 5

Additional electrochemical tests were performed in pH 7 0.4 M $NaH_2PO_4$, 0.6 M $Na_2SO_4$ solution (NaOH was used to adjust pH to 7) in three electrode cells.

Cyclic voltammetry (CV) of $Sr_2GaCoO_5$ and $Sr_2AlCoO_5$ catalyst materials was performed at pH 7. Working electrodes as described above were utilized. The electrochemical measurements were done in a three-electrode glass cell (125 ml) with the working electrode rotating at a rate of 1600 rpm, and Ag/AgCl (3M NaCl) as the reference. The counter electrode (Pt coil) was isolated from the main electrochemical cell using a fritted glass tube.

Figure 8:
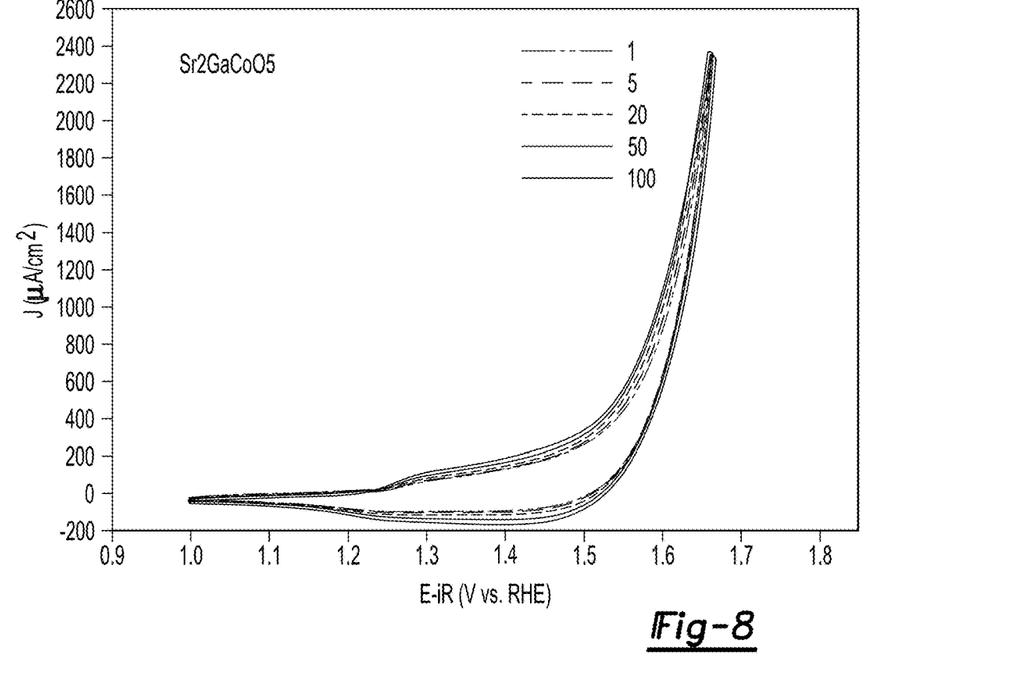
FIG. 8 are cyclic voltammetry (CV) plots for $Sr_2GaCoO_5$ at 10 mV/s at pH 7 from 1 to 100 cycles.
Figure 9:
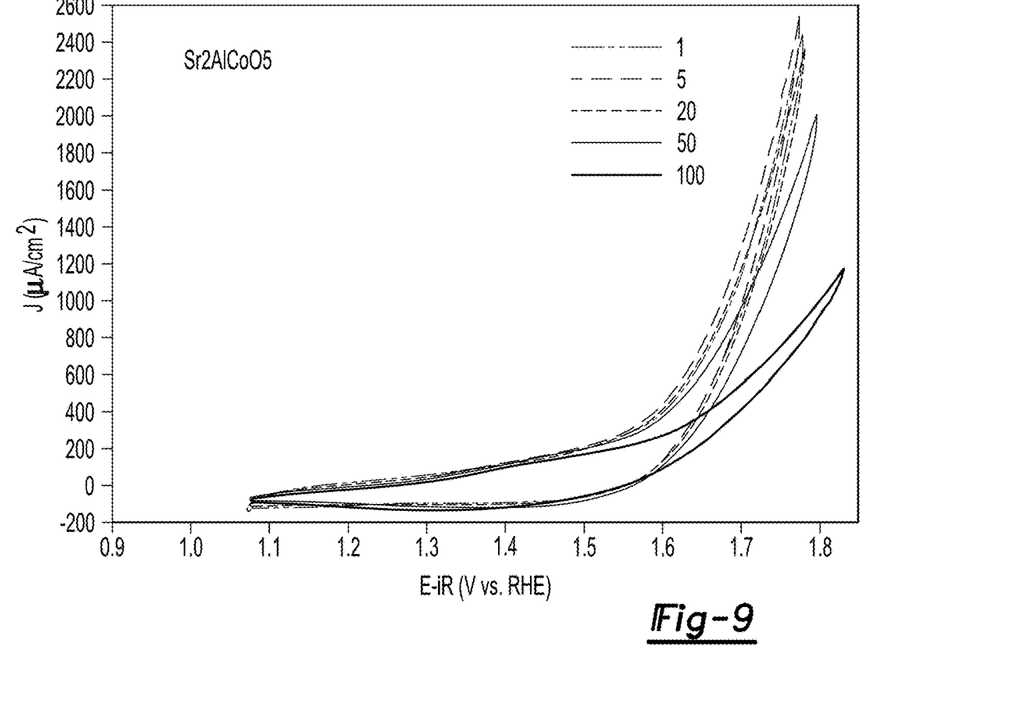
FIG. 9 are cyclic voltammetry plots for $Sr_2AlCoO_5$ at 10 mV/s at pH 7 from 1 to 100 cycles.

CV plots for 1 to 100 cycles for the $Sr_2GaCoO_5$ and $Sr_2AlCoO_5$ particles at a pH of 7 are shown in FIGS. 8 and 9. The CV plots were generated at a scan rate of 10 mV/s. Compared to $Sr_2AlCoO_5$, $Sr_2GaCoO_5$ exhibited higher (i.e. lower overpotential at fixed current or vice versa) and more stable OER activities.

Example 6

Figure 10:
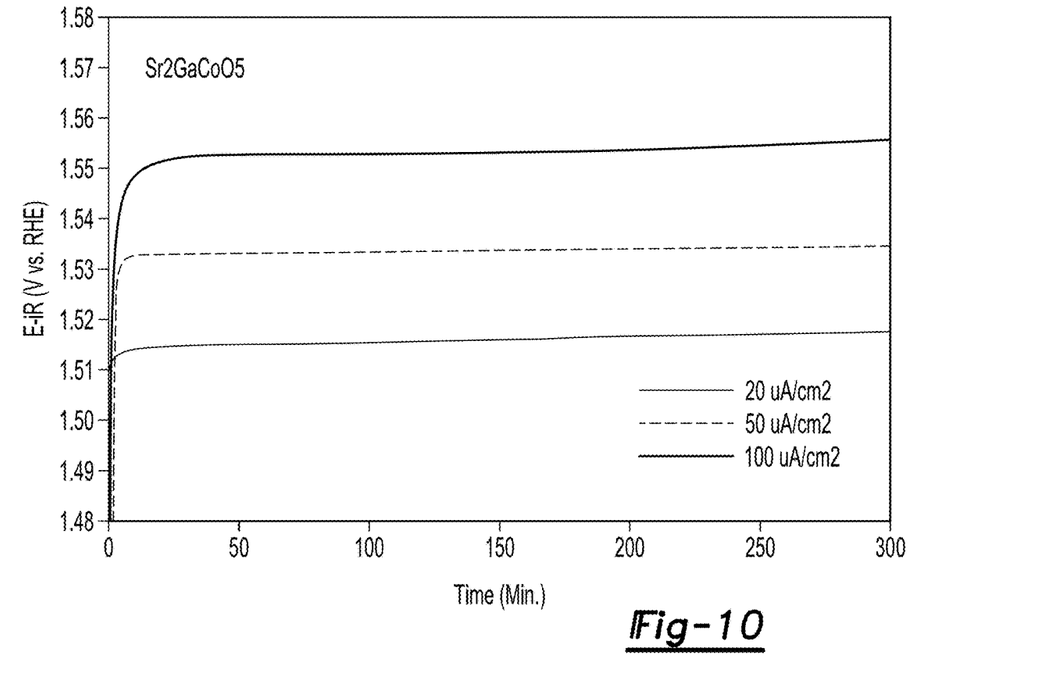
FIG. 10 are galvanostatic plots for $Sr_2GaCoO_5$ catalyst materials at 20 μA/cm², 50 μA/cm², and 100 μA/cm² and pH 7.
Figure 11:
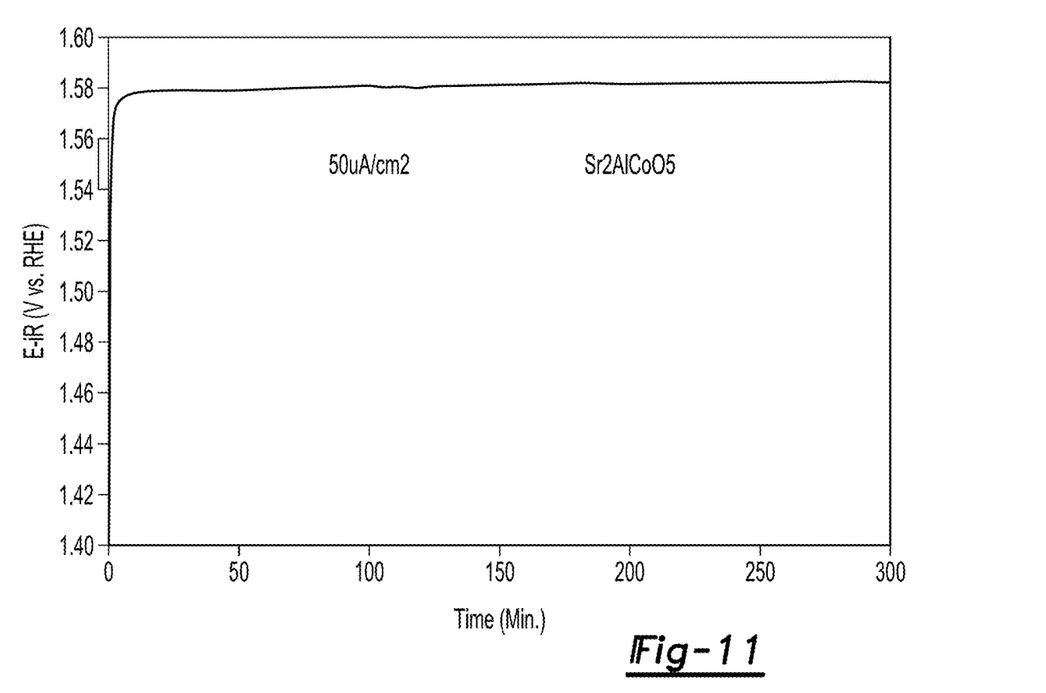
FIG. 11 are galvanostatic plots for $Sr_2AlCoO_5$ catalyst materials at 50 μA/cm² and pH 7.

Galvanostatic testing was also performed on the material using the same working electrode and experimental cell as described above. Referring to FIG. 10 galvanostatic plots for $Sr_2GaCoO_5$ catalyst material at 20 $\mu A/cm^2$, 50 $\mu A/cm2$, 100 $\mu A/cm^2$ and pH 7 are provided. Referring to FIG. 11 galvanostatic plots for $Sr_2AlCoO_5$ catalyst material at 50 $\mu A/cm2$ and pH 7 is provided. As can be seen in the plots the catalytic materials demonstrated a stability after an initial startup of the procedure with a near flat plot for a period out to 300 minutes.

Example 7

Figure 12:
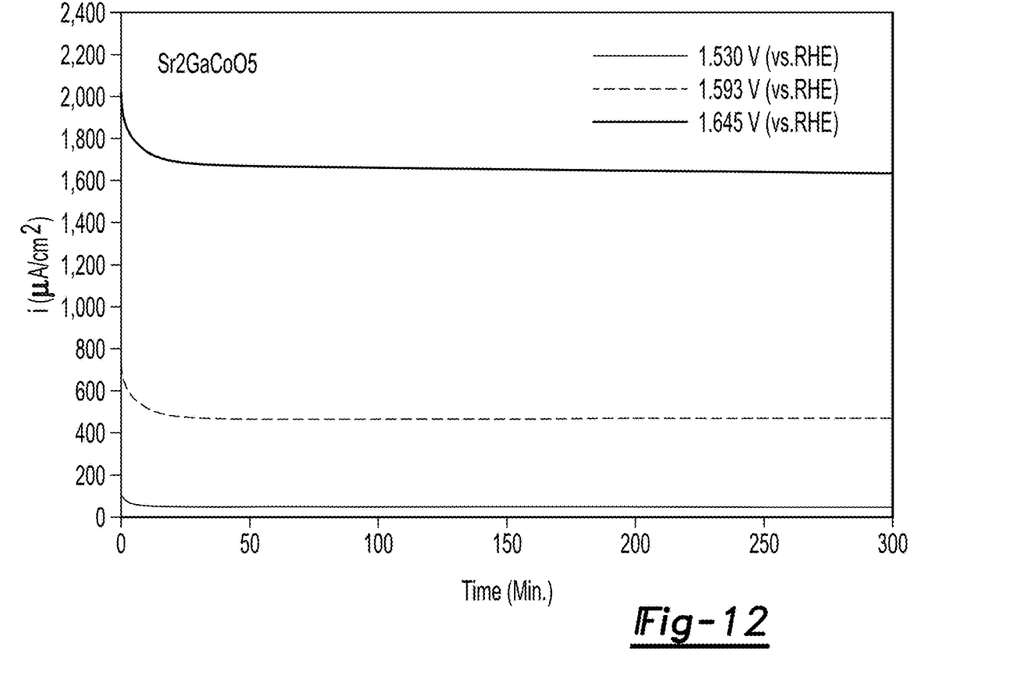
FIG. 12 are potentiostatic plots measured at 1.530 V vs. RHE, 1.593 V vs. RHE and 1.645 V vs. RHE and pH 7 for $Sr_2GaCoO_5$.
Figure 13:
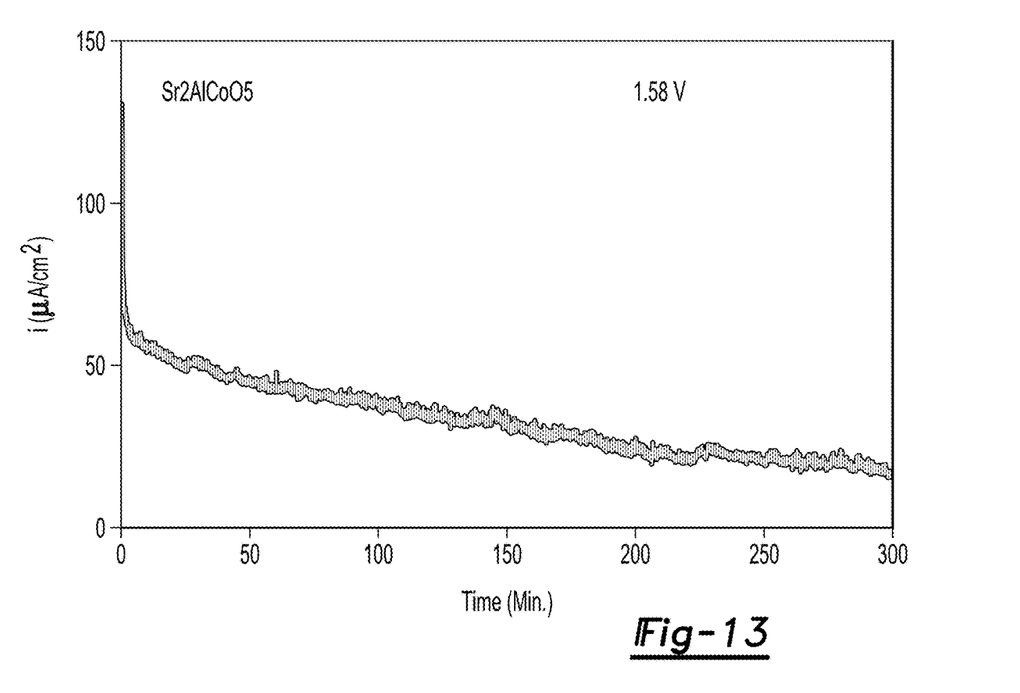
FIG. 13 are potentiostatic plots measured at 1.580 V vs. RHE and pH 7 for $Sr_2AlCoO_5$.
Figure 14:
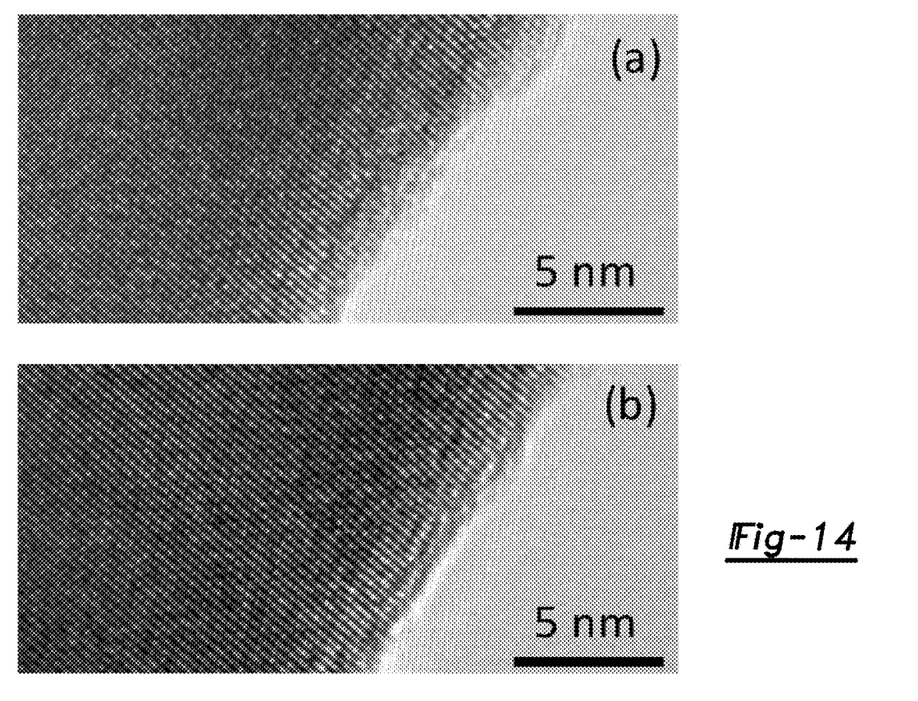
FIG. 14 are TEM images of $Sr_2GaCoO_5$ before (a) and after (b) 100 electrochemical cycles.
Figure 15:
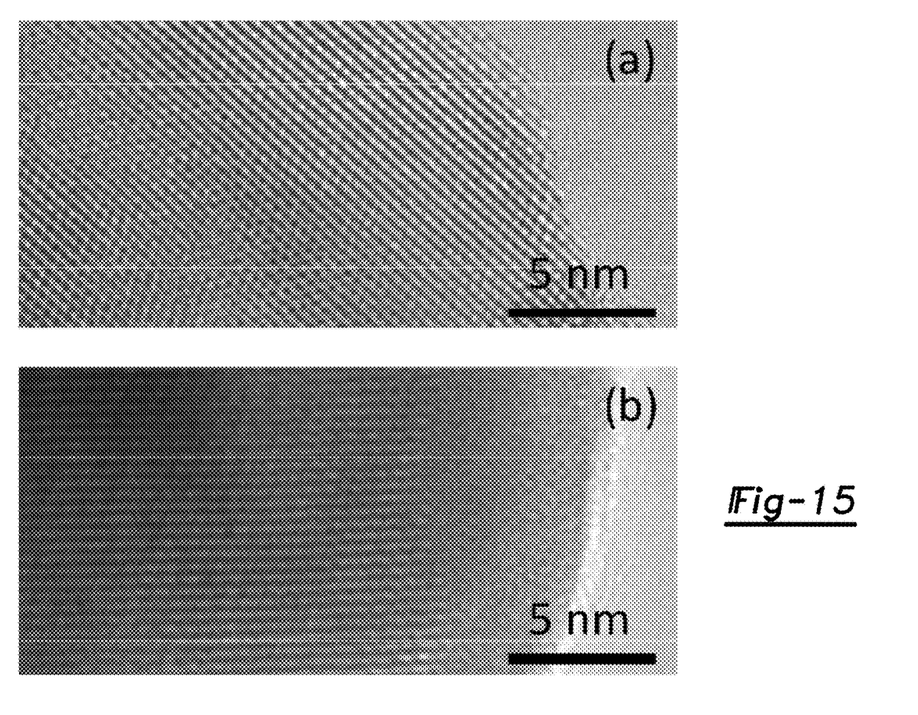
FIG. 15 are TEM images of $Sr_2AlCoO_5$ before (a) and after (b) 100 electrochemical cycles.

Potentiostatic measurements were performed on the $Sr_2GaCoO_5$ and $Sr_2AlCoO_5$ catalyst materials at pH 7 using the apparatus as described above. FIG. 12 are potentiostatic plots measured at 1.530 V vs. RHE, 1.593 V vs. RHE and 1.645 V vs. RHE for $Sr_2GaCoO_5$ whereas FIG. 13 is a potentiostatic plot measured at 1.580 V vs. RHE for $Sr_2AlCoO_5$. $Sr_2GaCoO_5$ exhibited superior stability. At 1.530 and 1.593 V, the current remains within 96% of its value after 300 minutes and at 1.645 V the current is at mA level and remains within 94% of its value after 300 minutes. The stability of the $Sr_2GaCoO_5$ exceeds those of any prior art materials which typically degrade dramatically at pH 7. Further evidence of the $Sr_2GaCoO_5$ stability against OER came from TEM imaging. The surfaces of as-synthesized $Sr_2GaCoO_5$ and $Sr_2AlCoO_5$ are perfectly crystalline (FIGS. 14(a) and 15(a)). After 100 electrochemical cycling, almost no change in the surfaces of $Sr_2GaCoO_5$ was observed while a certain degree of amorphization occurred for $Sr_2AlCoO_5$ after OER measurements (FIGS. 14(b) and 15(b)).

Example 8

Figure 16:
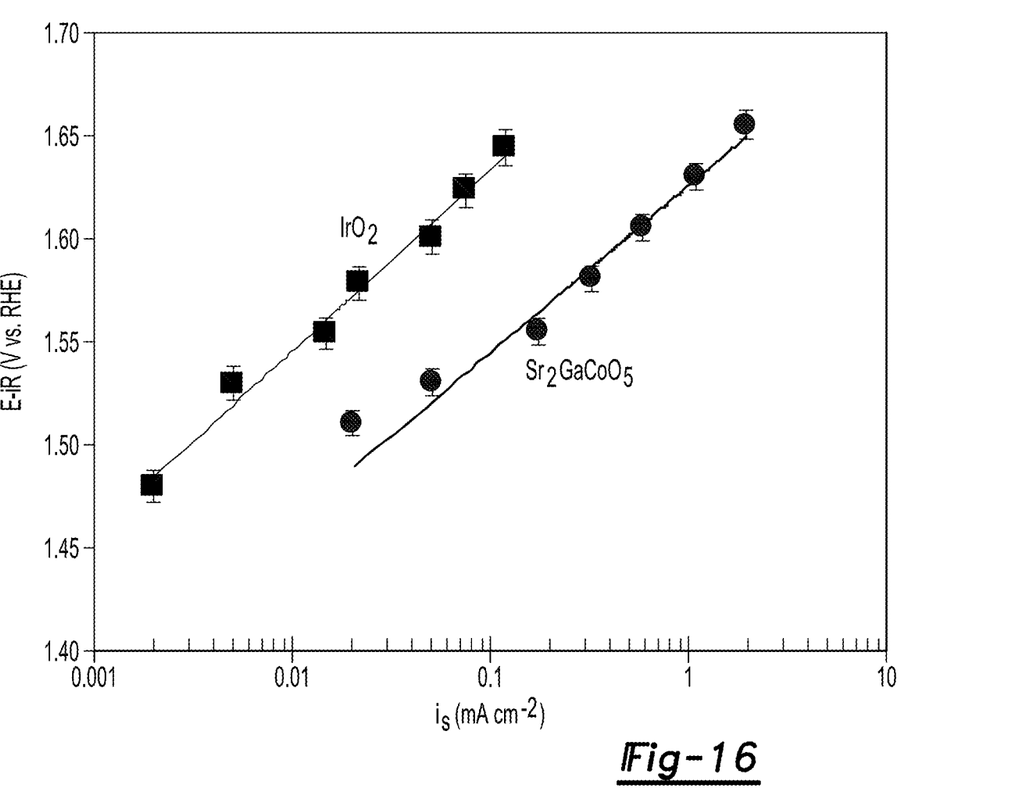
FIG. 16 is a Tafel plot of $Sr_2GaCoO_5$ at pH 7 with $IrO_2$ for comparison.

Tafel plot measurements of the catalyst material $Sr_2GaCoO_5$ at pH 7 are shown in FIG. 16 with $IrO_2$ for comparison. $Sr_2GaCoO_5$ represents on order of magnitude more active than $IrO_2$.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An oxygen evolution catalyst comprising a material of the formula: Sr2MCoO5 where M=Al, Ga wherein M is bonded with four oxygen atoms to form a tetrahedron and including conductive particles and a binder combined with particles of formula: Sr2MCoO5 where M=Al, Ga.

2. The oxygen evolution catalyst of claim 1 wherein the catalyst is operated at a potential of less than 1.58 volts vs. RHE at a current density of 50 µA/cm2 and a pH of from 7 to 13.

3. The oxygen evolution catalyst of claim 1 wherein the catalyst is operated at a potential of less than 1.55 volts vs. RHE at a current density of 50 µA/cm2 and a pH of 13.

4. The oxygen evolution catalyst of claim 1 wherein the material maintains a current within 97% after 300 minutes at potentials of from 1.51 to 1.55 volts vs. RHE.

5. The oxygen evolution catalyst of claim 1 wherein the material has the formula Sr2AlCoO5 and is operated at a potential of less than 1.55 volts vs. RHE at a current density of 50 µA/cm2 and a pH of 13.

6. The oxygen evolution catalyst of claim 5 wherein the material maintains a current within 97% after 300 minutes at a potential of 1.55 volts vs. RHE.

7. The oxygen evolution catalyst of claim 5 wherein the material has a Tafel slope of 89 mV per decade.

8. The oxygen evolution catalyst of claim 1 wherein the material has the formula Sr2GaCoO5 and is operated at a potential of less than 1.51 volts vs. RHE at a current density of 50 µA/cm2 and a pH of 13.

9. The oxygen evolution catalyst of claim 8 wherein the material maintains a current within 97% after 300 minutes at a potential of 1.51 volts vs. RHE.

10. The oxygen evolution catalyst of claim 8 wherein the material has a Tafel slope of 51 mV per decade.

11. The oxygen evolution catalyst of claim 1 including An a material of the formula: Sr2GaCoO5 wherein the catalyst is operated at a potential of less than 1.53 volts vs. RHE at a current density of 50 µA/cm2 and a pH of 7.

12. The oxygen evolution catalyst of claim 11 wherein the material maintains a current within 96% after 300 minutes at a potential of 1.530 volts vs. RHE.

13. The oxygen evolution catalyst of claim 11 wherein the material maintains a current within 96% after 300 minutes at a potential of 1.593 volts vs. RHE.

14. The oxygen evolution catalyst of claim 11 wherein the material maintains a current within 94% after 300 minutes at a potential of 1.645 volts vs. RHE.

15. The oxygen evolution catalyst of claim 14 wherein the current is greater than 1 milliamp.

16. The oxygen evolution catalyst of claim 11 wherein the material has a Tafel slope of 87 mV per decade.

17. The oxygen evolution catalyst of claim 1 wherein the catalyst is operated at a potential of less than 1.58 volts vs. RHE at a current density of 50 µA/cm2 and a pH of 7.

18. An oxygen evolution catalyst comprising a material of the formula: Sr2GaCoO5 wherein the catalyst maintains a current within 94% after 300 minutes at a potential of 1.645 volts vs. RHE wherein the current is greater than 1 milliamp and a pH of 7.

* * * * *